Patented Mar. 12, 1935

1,994,038

UNITED STATES PATENT OFFICE 1,994,038

HYDROXYALKYLCELLULOSE ESTER

Max Hagedorn, Dessau in Anhalt, and Paul Möller, Dessau-Ziebigk in Anhalt, Germany, assignors to I. G. Farbenindustrie Aktiengesellschaft, Frankfort-on-the-Main, Germany No Drawing. Application November 6, 1930, Serial No. 493,911. In Germany November 19, 1929

6 Claims. (Cl. 260—101)

Our present invention relates to soluble esters of hydroxyalkylcellulose containing in their molecule the radical of an organic acid.

One of its objects is to provide a new process of manufacturing the said cellulose esters.

Additional objects are the new cellulose compounds obtainable according to this process.

Further objects of our invention will be seen from the detailed specification following hereafter.

As known, hydroxyalkylcellulose esters of organic acids can be produced by treating hydroxyalkylcellulose in the same manner as unaltered cellulose, either with an acid chloride in the presence of a tertiary base or with an acid anhydride in the presence of catalysts and diluents.

According to our present invention radicals of organic acids are introduced into the molecule of hydroxyalkylcellulose by a simple treatment, preferably at a raised temperature, with the anhydride of the acid in the absence of catalysts and diluents. The free hydroxyl groups of the cellulose as well as the hydroxyl groups of the side chains enter into reaction. The great reactivity of the hydroxyalkylcellulose is most probably due to the presence of the said side chains. Such hydroxyalkylcelluloses are especially suitable as have been formed by the action of alkylene oxides upon alkali cellulose.

As organic acids to be esterified with a hydroxyalkylcellulose compound we enumerate the following: The lower saturated or unsaturated aliphatic acids, such as acetic acid, propionic acid, butyric acid and so on, the saturated or unsaturated higher fatty acids, such as stearic acid, lauric acid, oleic acid, cocinic acid, linoleic acid, ricinoleic acid and so on, furthermore, naphthenic acid and benzoic acid or other aromatic carboxylic acids or substitution products of these monobasic organic acids in form of their anhydrides. Instead of monobasic acid anhydrides we, likewise, may use as an esterifying agent anhydrides of polybasic organic acids, such as malonic acid, succinic acid, glutaric acid, fumaric acid, malic acid, tartaric acid, phthalic acid, naphthalene dicarbonic acid. When acting with the last mentioned anhydrides upon hydroxyalkylcellulose at a higher temperature and in the absence of catalysts and diluents, apparently both carboxylic groups participate on the esterification and new cellulose derivatives of resin-like character are obtainable.

They are soluble or swellable in acetone of 90 to 95 per cent strength and become plastic when warmed forming under these conditions viscous, liquid, transparent, ropy and sticky masses which after cooling solidify under formation of extremely hard, brittle, transparent, pulverable products.

While the new products obtainable according to our invention with aid of anhydrides of monobasic acids are of high technical value by the property of being soluble as primary formed esters, the new cellulose derivatives obtained by esterification of hydroxyalkylcellulose with a dibasic acid are valuable by their resin-like behavior. The last-named products are very similar to the condensation products obtainable from glycerin and phthalic acid and may be employed for the same purposes as these condensation products. They are suited, for instance, to be used as softening agents in the working up of other cellulose derivatives, such as cellulose nitrate or acetate. Furthermore, shaped articles may be made from them. For the same purpose, mixtures of our new cellulose derivatives or mixtures with artificial or natural resins may be worked up with aid of pressure and heat. Finally, solutions may be prepared from our new cellulose derivatives which may serve as varnishes or which may be worked up to form films, artificial threads and similar products with or without addition of filling materials, pigments, dyeing substances and similar products generally used in the cellulose industry.

Due to the mild reaction conditions, the structure of the cellulose molecule is not or only very slightly degraded so that products of a strong viscosity are obtained. This strong viscosity may be altered, if desired, by subjecting the products to a well known hydrolysis.

The following examples serve to illustrate our invention.

*Example 1.*—Hydroxyethyl cellulose made from alkali cellulose and ethylene oxide in the presence of benzene is introduced into ten times its weight of acetic anhydride. The mixture is heated for 2½ hours to 120° C. A clear, viscous solution is produced from which after cooling the hydroxyethyl cellulose acetate is obtained in a condition free from acid by precipitating with water and washing for a prolonged time with warm distilled water. The ester is soluble, for instance, in acetone without any further hydrolysis. From the solution of the esters in acetone films of a high mechanic solidity and a very small sensitiveness to water may be made.

*Example 2.*—A hydroxypropyl cellulose made by boiling alkali cellulose with propylene oxide in a reflux apparatus is entered into ten times its weight of butyric anhydride. The mixture is heated for 2½ hours to 120° C. A clear and viscous solution is obtained from which a hydroxypropyl cellulose butyrate can be isolated according to Example 1. The ester obtained is soluble in acetone and in other solvents customary for cellulose butyrate.

*Example 3.*—A hydroxybutyl cellulose made by boiling alkali cellulose with butylene oxide in a reflux apparatus is mixed with 8 to 10 times its weight of the anhydride of coconut fatty acid and the mixture is heated for 4 to 6 hours to 130–140° C. The temperature is then allowed to fall to 100° C. and the mixture is freed from the excess of anhydride and from the free acid formed during the reaction by boiling it for a prolonged time with an aqueous sodium carbonate solution. The resultant cocinic acid ester of the hydroxybutyl cellulose thus formed is isolated from the mixture in the manner indicated in Example 1. The ester is soluble in aromatic and chlorinated aliphatic hydrocarbons, in ether and ethyl acetate and substantially has the properties of the corresponding ester of the unaltered cellulose.

*Example 4.*—A dihydroxypropyl cellulose prepared by causing glycide to act upon alkali cellulose is acylated as indicated in Example 1. From the reaction mixture a dihydroxypropyl cellulose acetate soluble in acetone can be isolated.

*Example 5.*—1 part of hydroxyethyl cellulose made according to German Specification No. 363,192 by causing ethylene oxide to act upon cotton in the presence of dimethylaniline, is heated with 8 parts of naphthenic anhydride for 3–4 hours to 130–140° C. After cooling the naphthenic acid ester of the hydroxyethyl cellulose is obtained by an exhaustive extraction with methanol. It is soluble in aromatic hydrocarbons and in chlorinated aliphatic hydrocarbons.

*Example 6.*—Alkali cellulose is heated with a benzene solution of propylene oxide and butylene oxide, 1 part of the resultant hydroxypropyl-hydroxybutyl cellulose is heated with 8–9 parts of benzoic anhydride to about 130° C. After cooling, the benzoic acid formed and the excess of benzoic anhydride are eliminated by extraction with methanol. The remaining benzoic acid ester of the hydroxypropyl-hydroxybutyl cellulose is soluble in chlorinated hydrocarbons and may be made from these solutions into films.

*Example 7.*—1 part of hydroxyethyl cellulose made from alkali cellulose and ethylene oxide in the presence of benzene is introduced at a temperature of 135° C. in 10 parts of molten phthalic anhydride and the mixture is thoroughly stirred for 2 minutes. The end of the reaction is detectable on the swollen state of the introduced hydroxyethyl cellulose. The reaction mixture is worked up by extracting the phthalic anhydride in excess with, for instance, acetone. The end product forms a hard pulverable mass soluble in acetone of 90 per cent strength which melts under pressure at about 130–150° C. under formation of a transparent plastic mass which after cooling again becomes very brittle.

*Example 8.*—1 part of a hydroxypropyl cellulose made from alkali cellulose and propylene oxide in the presence of benzene, is treated at a temperature of 130° C. for 5 minutes with 10 parts of maleinic anhydride and then purified with acetone. It forms a mass which is soluble in acetone of 90 per cent strength.

*Example 9.*—1 part of hydroxyethyl cellulose made from alkali cellulose and ethylene oxide in the presence of benzene is heated for 5 minutes to a temperature of 130° C. with 10 parts of succinic anhydride. Then the anhydride in excess is removed by extraction with a suitable solvent. The purified end product is soluble in acetone of 90 per cent strength.

*Example 10.*—1 part of hydroxyethyl cellulose as used in the foregoing example is introduced into a solution of 11 parts of phthalic anhydride dissolved in 11 parts of glycol monomethyl acetate and boiled for 1 hour under reflux. The reaction mixture is filtered with suction and extracted to remove the anhydride in excess. 1.5 parts of a hydroxyethyl cellulose phthalate are obtained. This new cellulose derivative is swellable in acetone of 90 per cent strength.

As seen from the foregoing examples we prefer to use the acid anhydride used as esterifying agent, in a quantity exceeding that required theoretically. This feature, naturally, facilitates the reaction and as the excess of anhydride is easily recovered and may be used in a new operation, this step does not raise the costs. However, if necessary, the amount of the esterifying agent may be reduced to that required theoretically.

As further seen from the examples, we prefer to carry out our new process at temperatures ranging between about 120 to about 150° C. It may be said in this connection that it is not necessary to maintain strictly this range of temperature. It may be raised or lowered as necessitated by the starting materials used and it may vary if hydroxy alkyl celluloses are to be esterified which are prepared by different processes. The best mode of procedure may be determined in every case by some comparative experiments and variations of the temperature of the range given above, are considered to be within the spirit of the invention and the scope of the following claims.

As pointed out above, our new reaction is performed in the absence of catalysts and diluents. Traces of organic liquids which may adhere to the hydroxyalkylcellulose from their production, naturally dare not be considered.

What we claim is:—

1. The process which comprises introducing hydroxy-ethyl cellulose into ten times its weight of acetic anhydride, heating the mixture for 2½ hours to 120° C. and, after cooling, precipitating the formed hydroxyethyl cellulose acetate with water.

2. The processs of preparing hydroxyalkylcellulose esters which swell or dissolve in 90–95% acetone which comprises acting upon an hydroxyalkylcellulose, prepared by the reaction of an alkylene oxide upon alkali cellulose, with an organic acid anhydride in the absence of a catalyst and diluent at a temperature not exceeding 150° C.

3. The process of preparing hydroxyalkylcellulose esters which swell or dissolve in 90–95% acetone which comprises acting upon an hydroxyalkylcellulose, prepared by the reaction of an alkylene oxide upon alkali cellulose, with an organic acid anhydride in the absence of a catalyst and diluent at a temperature of about 120–150° C.

4. The process of preparing hydroxyalkylcellulose esters which swell or dissolve in 90–95% acetone which comprises acting upon an hydroxyalkylcellulose, prepared by the reaction of an alkylene oxide upon alkali cellulose, with an anhydride of a monobasic organic acid in the absence of a catalyst and diluent at a temperature not exceeding 150° C.

5. The process of preparing hydroxyalkylcellulose esters which swell or dissolve in 90-95% acetone which comprises acting upon an hydroxyalkylcellulose, prepared by the reaction of an alkylene oxide upon alkali cellulose, with an anhydride of a dibasic organic acid in the absence of a catalyst and diluent at a temperature not exceeding 150° C.

6. The process of preparing hydroxyethylcellulose esters which swell or dissolve in 90-95% acetone which comprises acting upon an hydroxyethylcellulose, prepared by the reaction of an ethylene oxide upon alkali cellulose, with an organic acid anhydride in the absence of a catalyst and diluent at a temperature not exceeding 150° C.

MAX HAGEDORN.
PAUL MÖLLER.